H. C. PROX.
ROLLER BEARING CAR WHEEL.
APPLICATION FILED SEPT. 27, 1915.
1,217,892.
Patented Feb. 27, 1917.
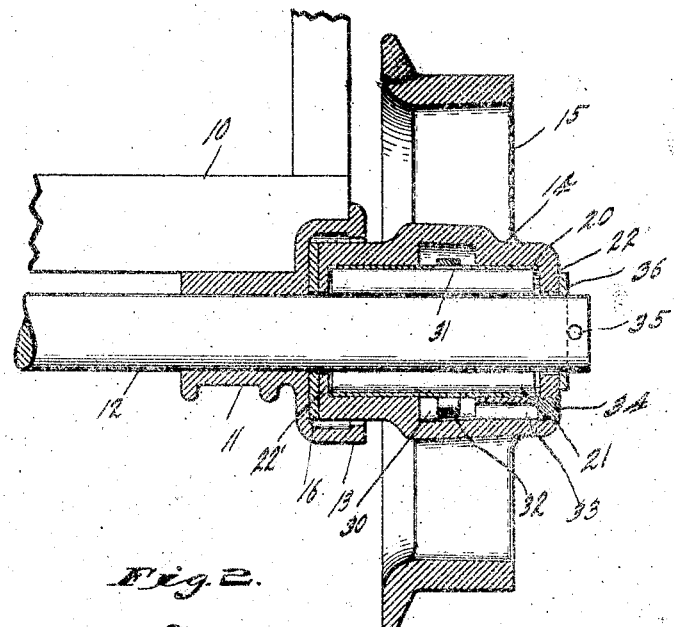
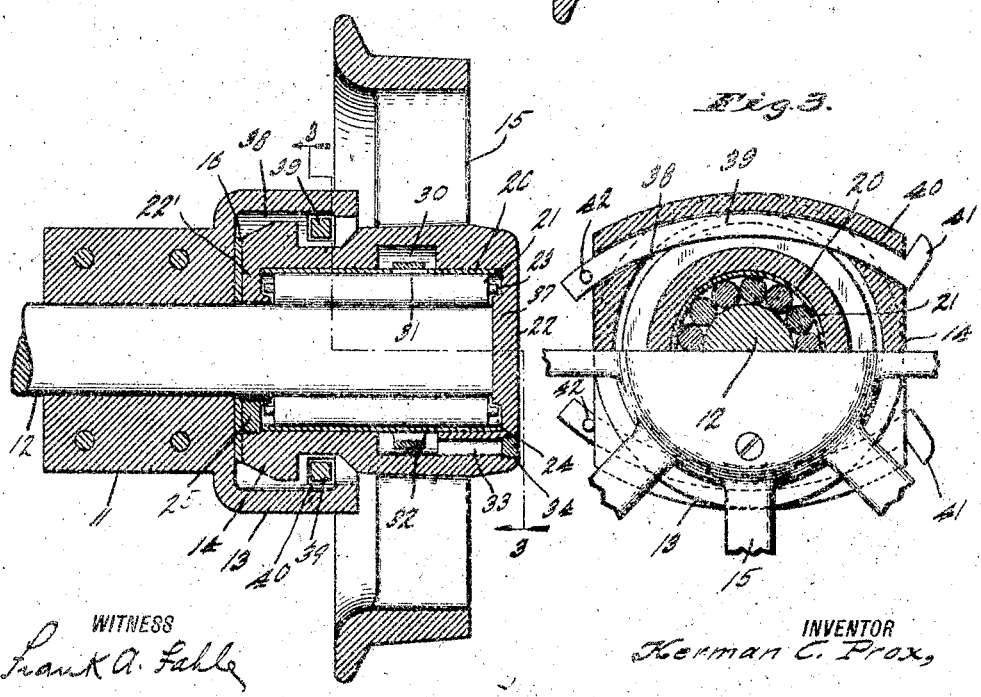
WITNESS
Frank A. Fahle
INVENTOR
Herman C. Prox,
BY
ATTORNEYS

UNITED STATES PATENT OFFICE.

HERMAN C. PROX, OF TERRE HAUTE, INDIANA, ASSIGNOR TO FRANK PROX CO., OF TERRE HAUTE, INDIANA, A CORPORATION OF INDIANA.

ROLLER-BEARING CAR-WHEEL.

1,217,892. Specification of Letters Patent. Patented Feb. 27, 1917.

Application filed September 27, 1915. Serial No. 52,784.

*To all whom it may concern:*

Be it known that I, HERMAN C. PROX, a citizen of the United States, residing at Terre Haute, in the county of Vigo and State of Indiana, have invented a new and useful Roller-Bearing Car-Wheel, of which the following is a specification.

It is the object of my invention to provide a roller bearing car wheel which shall have a longer life and shall require less frequent lubrication than those now in use.

In carrying out my invention, I cast in the hub of the car wheel a steel tube sufficiently larger than the axle to receive the desired rollers, and provide this hub with integral flanges which project inward past the ends of this steel tube and of the rollers. Preferably, I also provide a lubricant chamber, which may surround the steel tube referred to and communicate therewith through suitable openings, and this chamber contains a ring which acts like the ordinary ring oiler to bring the lubricant to the top. The rollers may be free in the roller chamber, or may be held therein by having on their ends projections which fit loosely in annular grooves in the ends of the roller chamber. The axle opening in the wheel hub is preferably closed at the outer face, to inclose the axle end, though if desired the axle end may project through.

The accompanying drawing illustrates my invention.

Figure 1 is a vertical sectional view through a car wheel equipped with one form of my roller bearing, showing its mounting on the axle and car; Fig. 2 is a similar view showing a slightly different form, which I now prefer; and Fig. 3 is a section on the line 3—3 of Fig. 2.

The car frame 10 has any suitable mounting 11 on the axle 12, this mounting conveniently consisting of a bearing surrounding the axle and provided with cup-shaped flange 13 which extends over the end of the hub 14 of the car wheel 15. A hardened steel washer 16 is preferably interposed between the end of the hub 14 and the bearing 11.

The hub 14 is cast around a steel tube 20, which is an integral tube and is sufficiently larger internally than the exterior of the axle 12 to provide a chamber for an annular series of rollers 21 by which the wheel 15 is carried on the end of the axle 12. This roller chamber is completely inclosed, for the hub 14 is provided at its ends with inwardly extending flanges 22 and 22' which project radially inward past the ends of the tube 20 and the rollers 21 at least substantially to the surface of the axle 12; the flange 22 in Fig. 2 projects inward even farther and forms a complete closure, for reasons hereinafter apparent. The rollers 21 may be free in the roller chamber, so that they will not be restrained when the wheel is removed from the axle, as shown in Fig. 1; or they may be suitably retained in such chamber, as by having projections 23 on their ends, which projections extend into annular grooves 24 on the inner axial faces of the flanges 22 and 22', as shown in Fig. 2. In the latter case, some special means must be provided for inserting the rollers 21 in the roller chamber, as they cannot be put in place from the inside before the axle 12 is inserted, as can be done in the arrangement shown in Fig. 1; and as a convenient means for doing this, I have provided a plug 25 through one of the inwardly projecting flanges, here the flange 22', which is the one farthest from the end of the axle 12. This plug is in line with the rollers 21 in the roller chamber, so that when such plug is removed the rollers may be inserted or taken out.

In order to lubricate the rollers 21, I provide a special lubricant chamber, shown in Figs. 1 and 2. There is a lubricant chamber 30 which surrounds the steel tube 20 at about the middle thereof, which chamber communicates with the roller chamber by a series of openings 31 through the steel tube 20. Preferably, there is cast in this chamber 21 a ring 32, which is of the proper size so that it rests on the exterior of the tube 20 at the top and just clears the bottom of the lubricant chamber 30. This ring acts as an ordinary ring oiler to carry the lubricant to the top as the wheel 15 rotates. Lubricant is supplied to the lubricant chamber 30 by a passage 33, which as shown extends along the hub 14 parallel to the axis and is closed at its outer end by a plug 34. Lubricant needs to be supplied to the chamber 30 only very infrequently, because by reasons of the flanges 22 and 22' there is very little loss of lubricant from the roller chamber, as the centrifugal force developed during rotation tends to keep the lubricant away from the openings between the inner edges of the flanges 22 and the axle 12.

In the arrangement shown in Fig. 1, the wheel 15 is held in place on the axle 12 by a transverse pin 35 which extends through the axle 12 near its ends, and beyond the outer flange 22, and bears against a hardened steel washer 36 located between such pin and the outer surface of the outer flange 22. This pin and washer and the end of the shaft 12 are exposed, in the arrangement shown. This is sometimes undesirable, as often it is preferred to close the outer face of the wheel hub and not allow the axle end to project. Such an arrangement is shown in Figs. 2 and 3. Here the flange 22 extends entirely across its end of the roller chamber to form an integral end piece 37, thus closing such chamber and inclosing the axle end. In order to hold the wheel on the axle, the hub 14 where it projects within the cup-shaped flange 13 is provided with an exterior circumferential groove 38 in which loosely fit curved pins 39 which are removably mounted in holes 40 in such cup-shaped flange 13 and are held in place by heads 41 at one end and removable cotter pins 42 at the other. The pins 39 coöperate with the shoulder at the side of the groove 38 to hold the wheel 15 on the axle, but may be withdrawn to permit the removal of such wheel.

I claim as my invention:

1. In combination, a wheel having a hub, a steel tube cast in said hub, and an annular series of rollers located within said steel tube to fit upon an axle, said hub having integral radially inwardly extending flanges beyond the ends of said steel tube and rollers.

2. In combination, a wheel having a hub, a steel tube cast in said hub, and an annular series of rollers located within said steel tube to fit upon an axle, said hub having integral radially inwardly extending flanges beyond the ends of said steel tube and rollers, and said flanges having annular grooves on their inner axial faces and said rollers having projections which extend into said annular grooves.

3. In combination, a wheel having a hub, a steel tube cast in said hub, and an annular series of rollers located within said steel tube to fit upon an axle, said hub having integral radially inwardly extending flanges beyond the ends of said steel tube and rollers, said hub having a lubricant chamber surrounding said steel tube, and said steel tube being provided with openings which connect said lubricant chamber with the roller-containing space within the steel tube.

4. In combination, a wheel having a hub, a steel tube cast in said hub, an annular series of rollers located within said steel tube to fit upon an axle, said hub having integral radially inwardly extending flanges beyond the ends of said steel tube and rollers, said hub having a lubricant chamber surrounding said steel tube and said steel tube being provided with openings which connect said lubricant chamber with the roller-containing space within the steel tube, and a ring loosely mounted in said lubricant chamber and surrounding said tube.

5. In combination, a wheel having a hub, a steel tube cast in said hub, an annular series of rollers located within said steel tube to fit upon an axle, said hub having integral radially inwardly extending flanges beyond the ends of said steel tube and rollers and also having an integral end piece which incloses the end of the axle and is a continuation of one of said flanges.

6. In combination, a wheel having a hub, a steel tube cast in said hub, an annular series of rollers located within said steel tube to fit upon an axle, said hub having integral radially inwardly extending flanges beyond the ends of said steel tube and rollers, and having at one end an integral end piece which incloses the end of the axle and at the other a circumferential groove for receiving a shoulder for holding it in place.

7. In combination, a wheel having a hub, a steel tube cast in said hub, and an annular series of rollers located within said steel tube to fit upon an axle, said hub having integral radially inwardly extending flanges beyond the ends of said steel tube and rollers, and also having an integral end piece which incloses the end of the axle.

8. In combination, a wheel having a hub, an annular series of rollers located within said hub to fit upon an axle, said hub having integral radially inwardly extending flanges beyond the ends of said rollers, and also having an integral end piece which incloses the end of the axle.

9. In combination, a wheel having a hub, an annular series of rollers located within said hub to fit upon an axle, said hub having integral radially inwardly extending flanges beyond the ends of said rollers, and said flanges having annular grooves on their inner axial faces and said rollers having projections which extend into said annular grooves, and said hub also having an integral end piece which incloses the end of the axle.

In witness whereof, I have hereunto set my hand at Terre Haute, Indiana, this eleventh day of September, A. D. one thousand nine hundred and fifteen.

HERMAN C. PROX.